Sept. 2, 1952     R. LAPSLEY     2,608,885
TRANSMISSION

Filed Feb. 9, 1948     2 SHEETS—SHEET 1

INVENTOR.
ROBERT LAPSLEY
BY *Walter E. Schirmer*
ATTY.

Sept. 2, 1952  R. LAPSLEY  2,608,885
TRANSMISSION

Filed Feb. 9, 1948  2 SHEETS—SHEET 2

*INVENTOR.*
ROBERT LAPSLEY
BY *Walter E. Schirmer*
ATTY.

Patented Sept. 2, 1952

2,608,885

UNITED STATES PATENT OFFICE 2,608,885

TRANSMISSION

Robert Lapsley, Berrien, Mich., assignor to Clark Equipment Company, Buchanan, Mich., a corporation of Michigan Application February 9, 1948, Serial No. 7,183

4 Claims. (Cl. 74—732)

1

This invention relates to transmissions and more particularly is concerned with a transmission employing a fluid torque converter in combination with planetary gearing for providing a low and direct forward drive and a reverse drive from the torque converter to the driving elements of the vehicle with which such transmission is used.

One object of the present invention is to provide a drive mechanism whereby direct shift can be made between reverse or forward drive through one shift element, and the other shift element provides for control of low or direct drive.

Another feature of the present invention is the provision of a mechanism for insuring that the planetary assembly will be brought to a stop when it is desired to shift from neutral either into a forward or reverse direction to prevent undue clashing of gears or the like.

Still another feature of the present invention is the provision of an interlocking mechanism which insures actuation of the brake to stop the planetary mechanism before shifting of the gear for controlling forward or reverse movement can be effected.

Another feature of the present invention is the provision of a novel type of clutch mechanism for controlling the low and direct drive through the planetary gearing, which mechanism consists of a rocker type clutch in combination with one-way clutches controlling the movement of the planetary spider.

Other objects and advantages of the present invention will appear more fully from the following detailed description, which, taken in conjunction with the accompanying drawings will disclose to those skilled in the art, the particular construction and operation of a preferred form of the present invention.

Figure 1:
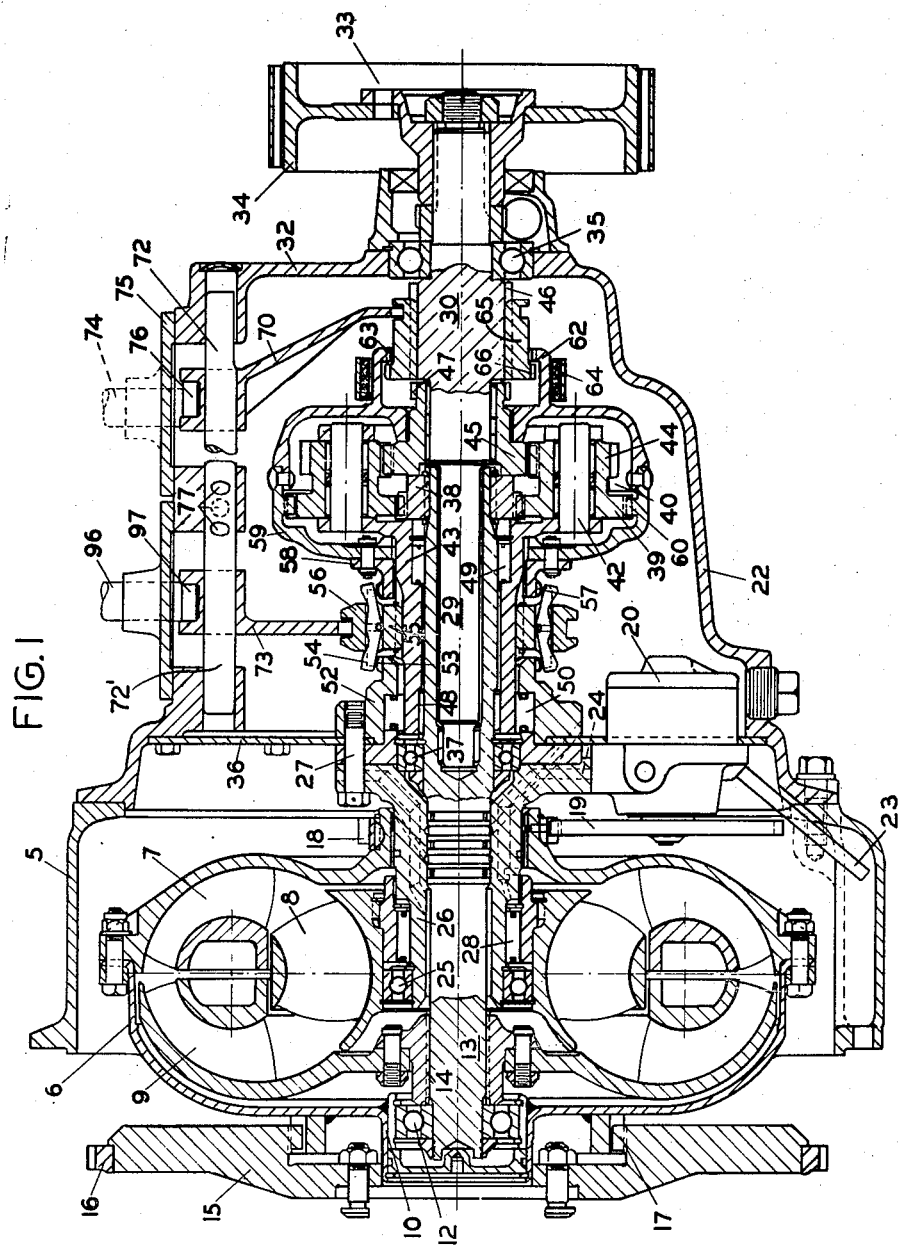
Figure 1 is a sectional view through a transmission construction embodying the present invention.

Referring now in detail to the drawings, there is disclosed a bell housing 5, which is adapted to enclose a fluid drive unit, indicated generally at 6, and consisting of an impeller unit 7, a reaction

2 unit 8, and a driven or turbine unit 9. The housing for the impeller unit 7 is adapted to be mounted by means of the flange portion 10 thereof, upon a bearing assembly 12, supporting one end of the output or drive shaft 13, which has splined connection as at 14, to the hub portion of the driven element 9 of the converter.

Preferably, a suitable plate member 15, is provided, carrying the starter gear 16, and also being adapted to be bolted to the flywheel of the engine for connection thereto. It will be noted that this member 15 has keyed connection, as indicated at 17, to the housing of the torque converter and thus to the impeller member 7. The hub portion of the impeller member is provided with a gear 18, adapted to have driving engagement with the gear 19 on the shaft of a small oil pump or the like, indicated generally at 20, and located within the transmission housing 22. This pump has an inlet extending down into a suitable sump portion of the bell housing 5, such inlet being indicated at 23, and in turn, is adapted to discharge fluid through the passageway 24 into the interior of the converter and past the bearing 25, which mounts the reaction member 8 upon a fixed sleeve 26, which, through the flange connection 27, is bolted to the housing 22.

A suitable one-way brake 28, is provided in the hub portion of the reaction member 8, to prevent reverse rotation thereof, this member being mounted between the sleeve 26 and the hub portion of the reaction member.

The shaft 13 extends into the housing 22 and is counterbored axially to receive the projecting end 29 of the output shaft 30, extending outwardly through the rear end wall 32 of the housing 22, and carrying at its outer end a companion flange 33 and brake drum 34, the flange providing connection to the propeller shaft of the vehicle. A suitable ball bearing assembly 35 maintains the shaft 30 in the rear end wall 32 of the housing, and the forward end 29 of this shaft is journalled within the end of the shaft 13 by needle roller bearings. The shaft 13, intermediate its ends, is supported in the partition wall 36 between the bell housing and the transmission housing 22 by means of the bearing assembly 37, thereby supporting the shaft against bending stresses.

The shaft 13, at its projecting end, is splined to receive the sun gear 38, which sun gear is locked onto the end of the shaft and is adapted to have meshing engagement with the larger gear portion 39 of the double pinion planetary gears 40 mounted on the shaft 42, carried by the planet spider 43. The smaller gear portion 44 of the double planet gear 40, in turn, has meshing engagement with a gear 45, mounted by means of suitable needle bearings upon the shaft 30, adjacent to the enlarged splined portion 46 of such shaft. The gear 45, at its opposite end, is provided with a small clutch portion 47, disposed adjacent to and of the same diameter as the splines 46.

The planet spider sleeve 43, which carries the planet gears 40, is mounted on the shaft 13 by means of needle roller bearings 48, and a one-way clutch, indicated at 49. This one-way clutch is operable to prevent the planet sleeve from rotating in a direction tending to overrun the shaft 13.

At the end of the sleeve outwardly from the needle bearings 48, there is provided a second one-way brake 50, which operates to hold the sleeve 43 against reverse rotation when the vehicle tends to run faster than the shaft 13; i. e. when the vehicle tends to coast. This brake has bearing about its outer periphery on a fixed ring member 52, secured to the partition wall 36, and carrying a tooth portion 53, adapted to be engaged by the rocker arm members 54 of a clutch and brake mechanism consisting of a hub element 55, splined on the sleeve 43 and including an encircling yoke or collar 56. The hub member 55 is provided with a plurality of circumferentially spaced axially directed slots or grooves within which are disposed the rocker arms 54, and axial movement of the collar 56 causes one or the other of these rocker arms to be rocked downwardly into braking position with the adjacent clutch teeth 53 in one case, or with the clutch teeth 57 in the opposite case, the clutch teeth 57 being carried upon the flanged ring member 58, riveted or otherwise secured to a housing element 59, encircling the planetary spider and including the internal ring gear element 60.

The member 59 extends over beyond the outer end of the planetary spider and is adapted to embrace the intermediate portion of the gear member 45 and to have a brake flange portion 62 terminating in an internally toothed clutch portion 63. The brake portion 62 of this housing member is surrounded by a band brake element 64, which is operable to be clamped about this housing member for holding it against rotation during shifting movement of the shiftable member 65, mounted upon the splined portion 46 of the shaft 30. The member 65 is adapted, when shifted to the left from the neutral position shown in Figure 1, to have its internal teeth engaged with the teeth 47 of the gear 45. When shifted in the opposite direction from neutral position, the external clutch teeth 66 on the member 65, are adapted to mesh with the teeth 63 of the housing 59, thereby coupling the housing 59 directly to the shaft 30.

In the operation of the device as thus described, it will be apparent that with the hub member 55 shifted into position with the rocker arms 54 in engagement with teeth 53, the planetary sleeve 43 is locked in position against rotation. As a result, when the member 65 is shifted to the left, a forward drive is provided at low speed from gear 38, through gear portion 39, thence through the opposite gear portion 44 of the planet gears 40 to gear 45, and thence to shaft 30 through the coupler member 65. Upon shifting of the hub member 55 in the opposite direction, that is with the rocker arms being released from the teeth 53 and forced into engagement with the clutch teeth 57, the planet spider and the outer ring gear contained in the housing 59, are locked together for conjoint rotation, thereby providing direct drive with the member 65 remaining in the same position.

When it is desired to shift from a forward drive to a reverse drive, it is necessary to shift the member 65 from the left through neutral position to the right hand position, with the teeth 63 and 66 in engagement. A shift in this direction couples the shaft 30 to the planetary housing 59 and through the reverse direction of rotation of this housing, since it is driven in an opposite direction through the planet spiders, a reverse torque is applied to the shaft 30. In order to shift from either forward or reverse position through neutral to the proper driving position, there is provided a shifter arm 70, engageable with a yoke collar formed in the member 65, and having its opposite end mounted upon a shift rail 72, mounted for sliding movement in the upper portion of the transmission housing. The shift rail 72' is adapted to carry the fork 73, for engagement with the yoke collar 56. The fork 70 is adapted to be operated by means of a shaft member 74, extending through a cover plate 75, mounted on the housing 22, and having an offset actuating portion 76, engageable in a notch in the shifter fork arm, whereby upon rotation of shaft 74, the fork will be shifted in one direction or the other.

Suitable detent means, indicated at 77, resiliently holds the shift rail in any of its shifted positions.

In order to prevent clashing of the teeth, it is necessary that in shifting from one engaged position to the other engaged position of the member 65, the housing 59, must be held against movement during this shifting operation. This is accommodated by the provision of an interlocking mechanism shown more in detail in Figure 3A, and including a control lever 78, mounted for universal movement as by the ball and socket arrangement 79, and through the link 80 is connected to an interlock arm 82, mounted for sliding movement in the block member 83. Extending into the block member 83, at right angles to the direction of travel of the interlock 83, are the plungers or operating arms 84 and 85, each of which carries a roller at the lower end thereof, adapted to engage the cam surfaces of the interlock member 82.

Spring means 86 and 87, respectively, normally urge the plungers 84 and 85 into pressure contact with the cam surfaces. The member 84 is adapted to be connected to suitable control mechanism for actuating the brake 64, through linkage connected to the projecting end of the plunger 84. The plunger 85, on the other hand, is connected through suitable linkage through the rotatable control shaft 74, for controlling the shifting movement of the shifter fork 70. As will appear in Figure 3A, the plunger 84 is in non-operative position, the roller being located in the depression 90 of the interlock block. As the lever 78 is actuated to move the interlock 82 to the left, it will be noted that the plunger 85 remains on the flatted portion 92 of the interlock so that it is not actuated, thereby holding the member 65 in one of its engaged positions. As the interlock 82 is actuated, the plunger 84 is moved upwardly due to its rolling up onto the raised surface 93, thereby actuating the brake mechanism 64 to lock the housing 59 against rotation. When this has occurred, continuing movement of the interlock causes the plunger 85 to be raised onto the surface 94, which, in turn, operates the shift mechanism for the fork 70, moving the gear from one driving position to the reverse driving position. Continued movement of the interlock block in the same direction, drops the plunger 84 back into the depressed portion 95 of the interlock, thereby again releasing the brake to allow rotation of the member 59, which, however, occurs after the shift has been effectuated.

Figure 3A:
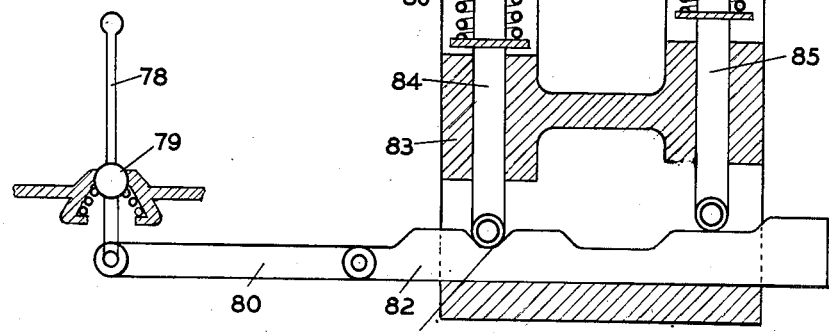
Figure 3A is a diagrammatic view of the interlocking mechanism for controlling the forward and reverse gear shift control.
Figure 3B:
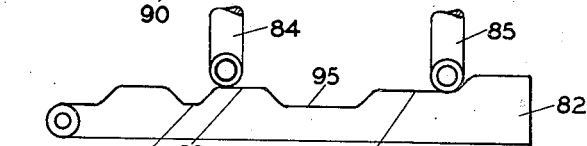
Figures 3B to 3D, inclusive, show other operating positions of this interlocking control mechanism.
Figure 3C:
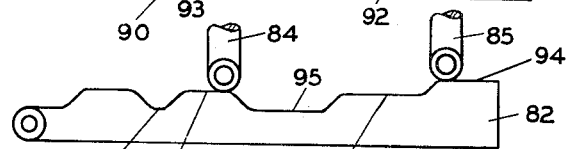
Figure 3D:
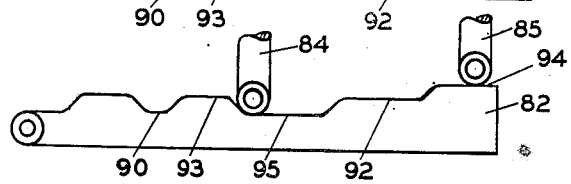

As a result, it will be apparent that whenever shift is to be made either from the position shown in Figure 3A to that of Figure 3D, or in the opposite direction, the brake is always actuated prior to release of the shifter fork 70 from one position, and its actuation into the opposite position, after which the brake is again released.

The shifter fork 73 is also adapted to be actuated by a rotatable arm 96 extending through the cover plate 75 and having an offset actuating portion 97. However, the member 56 is never in neutral position, being engaged prior to starting of the vehicle either in its low or direct driving position. Low drive is effectuated by shifting the hub member 55 to the left, thereby locking the sleeve 43 against rotation relative the housing, while a shift to the right locks the sleeve and the housing 59 for conjoint rotation.

When the vehicle has been started in low gear, it can continue to be operated in such gear with shifts being made between forward or reverse drive. If it is desired, for example, in forward direction of drive to shift into high gear, the shifter fork 70, is not actuated, but the shifter fork 73 may be actuated to the right, locking up the planetary assembly, so that a direct drive is effected from shaft 13 into shaft 30.

Shafts 72 and 72' have an interlock between them so that shaft 72 cannot be moved to effect reverse unless shaft 72' has first been moved to lock the planet spider sleeve 43 to the housing partition wall 36 through the rocking member and also to prevent shaft 72' from moving to effect direct drive unless reverse drive is disengaged.

Figure 2:
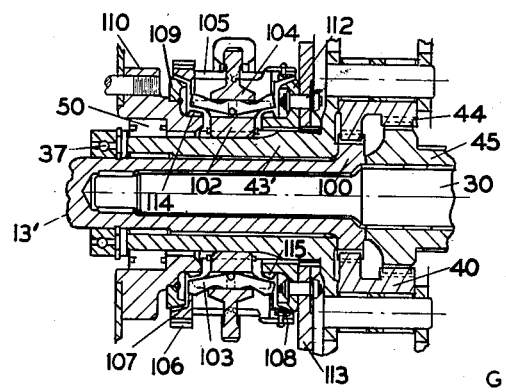
Figure 2 is a detail sectional view showing a modified form of gear and clutch mechanism.

In the modified form of the invention disclosed in Figure 2, the shaft 13', corresponding to the shaft 13 of Figure 1, is provided with an integral sun gear portion 100, at the end thereof, which telescopes over the shaft 30. The planet sleeve 43', in this form of the invention, carries the double planet gear 40, arranged in the same manner as described previously, which has the smaller gear portion 44 thereof meshing with the gear 45, rotatably journalled about shaft 30.

Splined on the planet sleeve 43' is a hub portion 102 of a rocker type clutch and brake, having axially directed circumferentially spaced grooves receiving the rocker arms 103, which, in turn, are adapted to be actuated by the encircling yoke member 104, which yoke member has projecting arm portions extending through openings 105, in a synchronizer sleeve 106. The sleeve 106, at opposite ends thereof, has the synchronizer cones 107 and 108, respectively, which cones are adapted to have frictional engagement with corresponding cone-like surfaces 109 on the fixed housing members 110 and 112 on the planet housing member 113. The fixed member 110 also has the small brake tooth portion 114, adapted to be engaged by one end of the rockers 103 when the collar 104 is shifted to the left and the housing member 113 is also provided with clutch tooth portions 115 for engagement by the rockers when the collar 104 is shifted to the right.

The remainder of the operation of the mechanism shown in Figure 2 is similar to that described in connection with Figures 1 and 3, and consequently, it is not believed necessary to go into further detail with respect thereto.

It is believed apparent that the present invention therefore provides a fluid type drive into a planetary gear construction, wherein either forward or reverse drive can be effected by a sliding member shift in conjunction with the brake element having suitable interlock means for insuring that there will be no clashing of this member when being shifted to one or the other of its operative positions.

Low and direct drive is provided by the rocker type clutch and brake either in conjunction with a one-way brake on the planetary sleeve 43 or in conjunction with synchronizing means associated with the rocker member. Consequently, a simplified transmission for use behind the fluid torque converter is provided which has relatively simplified shifting control and can be made very compact and at low cost.

I am aware that various changes may be made in certain details of the present construction without in any way departing from the underlying features of the invention, and I therefore do not intend to be limited except as defined by the scope and spirit of the appended claims.

I claim:

1. A transmission including a transmission housing, a fluid drive unit having a driven shaft, a first sun gear secured to said driven shaft, a transmission output shaft fixed against axial movement and journaled in said transmission housing, planet pinions meshing with said first sun gear, a ring gear and a sleeve surrounding said driven shaft, said sleeve carrying said planet pinions, said ring gear meshing with said planet pinions, means for locking said sleeve either to said housing or to said ring gear, a freely rotatable second sun gear journaled on said output shaft, said second sun gear adapted to engage with said planet pinions, means including a sleeve member axially shiftable on said output shaft arranged to be shifted in one direction from neutral position to a position coupling said ring gear to said output shaft and in the opposite direction from neutral position to a position coupling said freely rotatable second sun gear to said output shaft, said ring gear having a brake drum portion of a smaller diameter than said ring gear, a brake operable to engage therewith, and interlocking means arranged to actuate said brake means prior to shifting of said axially shiftable sleeve member out of one coupling position and to maintain said actuation until shifted into its other coupling position.

2. In a transmission, a housing, a fluid driven shaft extending into said housing and carrying a first sun gear, an output shaft journaled at one end in said driven shaft and having a sleeve member with outwardly radially extending clutch teeth splined for axial shifting thereon, a freely rotatable second sun gear fixed against axial movement on said output shaft, a planetary spider having pairs of pinion gears, one pinion gear of each pair being driven by said first sun gear, the other pinion gear of each pair having engagement with said second sun gear, a ring gear adapted to be driven from one pinion gear of each pair, said ring gear having radially inwardly extending side portions, clutch and brake means for selectively locking said spider against rotation relative to the housing or for clutching it to said ring gear, an annular flange depending from one of said ring gear side portions, radially inwardly directed clutch teeth formed adjacent the end of said annular flange; said sleeve member arranged to be shifted in one direction from neutral position to a position wherein the clutch teeth of said sleeve engage the clutch teeth on the flange of said ring gear thereby clutching said ring gear to said output shaft and in the opposite direction from neutral position to a position clutching said second sun gear to said output shaft, a brake band adapted to cooperate with the annular flange of said ring gear, and interlocking means arranged to actuate said brake means prior to shifting of said sleeve member out of one clutching position and to maintain said actuation until shifted into its other clutching position.

3. In a transmission, a housing, a fluid driven shaft extending into said housing and carrying a first sun gear, an output shaft journaled at one end in said driven shaft and having a sleeve member with outwardly radially extending clutch teeth splined for axial shifting thereon, a freely rotatable second sun gear fixed against axial movement on said output shaft, clutch teeth formed on the hub portion of said second sun gear, a planetary spider having pairs of pinion gears, one pinion gear of each pair being driven by said first sun gear, the other pinion gear of each pair having engagement with said second sun gear, a ring gear adapted to be driven from one pinion gear of each pair, said ring gear having radially inwardly extending side portions, clutch and brake means for selectively locking said spider against rotation relative to the housing or for clutching it to said ring gear, an annular flange depending from one of said ring gear side portions, radially inwardly directed clutch teeth formed adjacent the end of said annular flange, said sleeve member arranged to be shifted in one direction from neutral position to a position wherein the clutch teeth of said sleeve engage the clutch teeth on the flange of said ring gear to effect clutching of said ring gear to said output shaft and in the opposite direction from neutral position to a position wherein the spline teeth of said sleeve engage the clutch teeth on the hub of said second sun gear to effect clutching of said second sun gear to said output shaft, a brake band adapted to cooperate with the annular flange of said ring gear, and interlocking means arranged to actuate said brake means prior to shifting of said sleeve member out of one clutching position and to maintain said actuation until shifted into its other clutching position.

4. In a transmission, a housing, a fluid driven shaft extending into said housing and carrying a first sun gear, an output shaft journaled at one end in said driven shaft and having a sleeve member with outwardly radially extending clutch teeth splined for axial shifting thereon, a freely rotatable second sun gear fixed against axial movement on said output shaft, clutch teeth formed on the hub portion of said second sun gear, a planetary spider having pairs of pinion gears, one pinion gear of each pair being driven by said first sun gear, the other pinion gear of each pair having engagement with said second sun gear, a ring gear adapted to be driven from one pinion gear of each pair, said ring gear having radially inwardly extending side portions, clutch and brake means for selectively locking said spider against rotation relative to the housing or for clutching it to said ring gear, an annular flange depending from one of said ring gear side portions, radially inwardly directed clutch teeth formed adjacent the end of said annular flange, said sleeve member arranged to be shifted in one direction from neutral position to a position wherein the clutch teeth of said sleeve engage the clutch teeth on the flange of said ring gear to effect clutching of said ring gear to said output shaft, and in the opposite direction from neutral position to a position wherein the splined teeth of said sleeve engage the clutch teeth on the hub of said second sun gear to effect clutching of said second sun gear to said output shaft, and a brake band adapted to cooperate with the annular flange of said ring gear for braking the latter during shifting of said sleeve member between its said two clutching positions.

ROBERT LAPSLEY.

REFERENCES CITED

The following references are of record in the file of this patent:

UNITED STATES PATENTS

| Number | Name | Date |
|---|---|---|
| 1,029,018 | Kinney | June 11, 1912 |
| 1,703,846 | Jackson | Feb. 26, 1929 |
| 2,006,160 | Dodge | June 25, 1935 |
| 2,034,429 | De Lavaud | Mar. 17, 1936 |
| 2,194,823 | Dooley | Mar. 26, 1940 |
| 2,196,660 | Dodge | Apr. 9, 1940 |
| 2,298,648 | Russell | Oct. 13, 1942 |
| 2,316,390 | Biermann | Apr. 13, 1943 |
| 2,350,810 | Pentz | June 6, 1944 |
| 2,414,832 | Orr | Jan. 28, 1947 |

FOREIGN PATENTS

| Number | Country | Date |
|---|---|---|
| 7,174 | Great Britain | Mar. 24, 1906 |
| 765,796 | France | June 15, 1934 |